No. 870,570. PATENTED NOV. 12, 1907.
J. MANGAN.
RIDING ATTACHMENT FOR HARROWS.
APPLICATION FILED JULY 13, 1906.
2 SHEETS—SHEET 1.
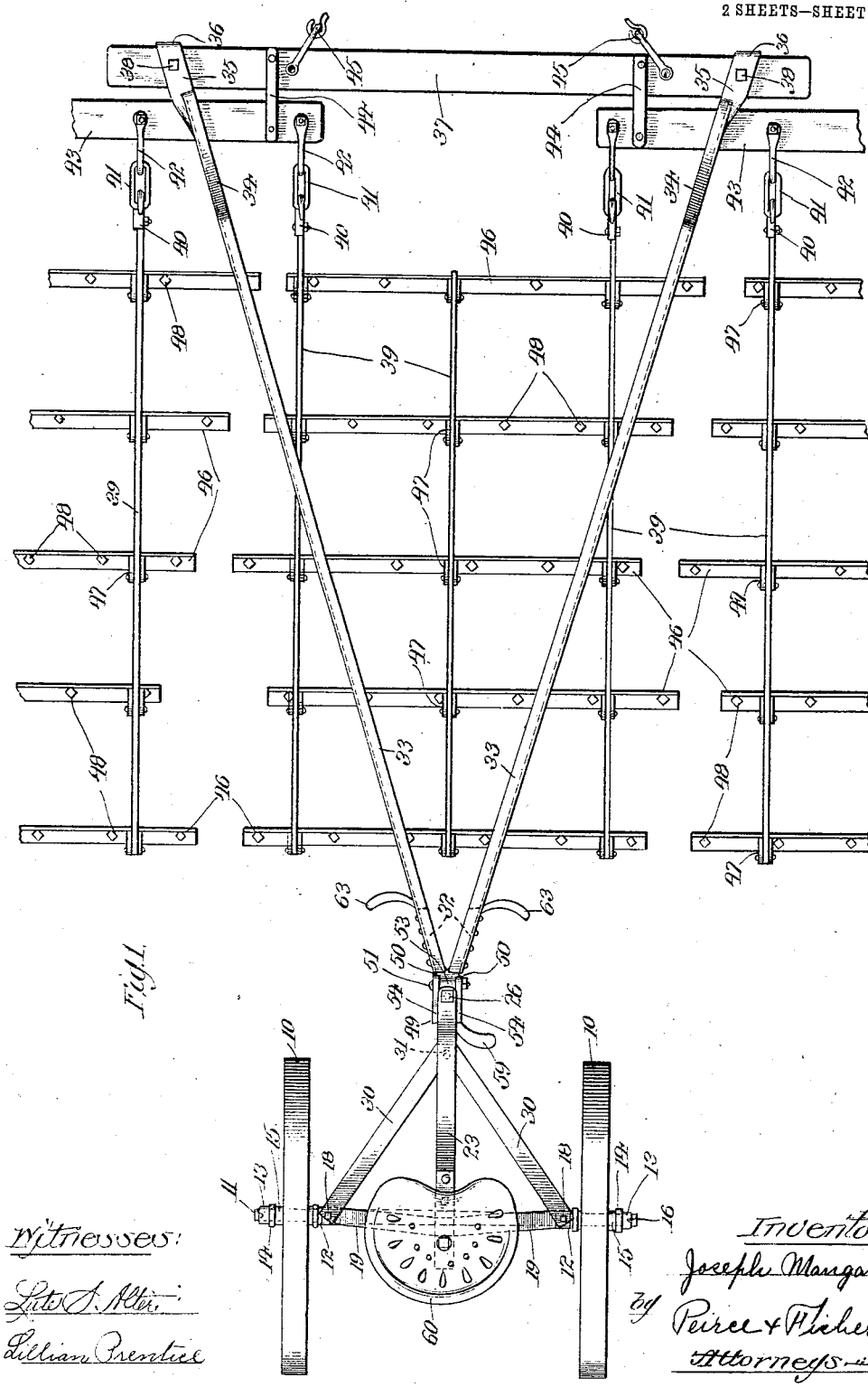

No. 870,570. PATENTED NOV. 12, 1907.
J. MANGAN.
RIDING ATTACHMENT FOR HARROWS.
APPLICATION FILED JULY 13, 1905.
2 SHEETS—SHEET 2.
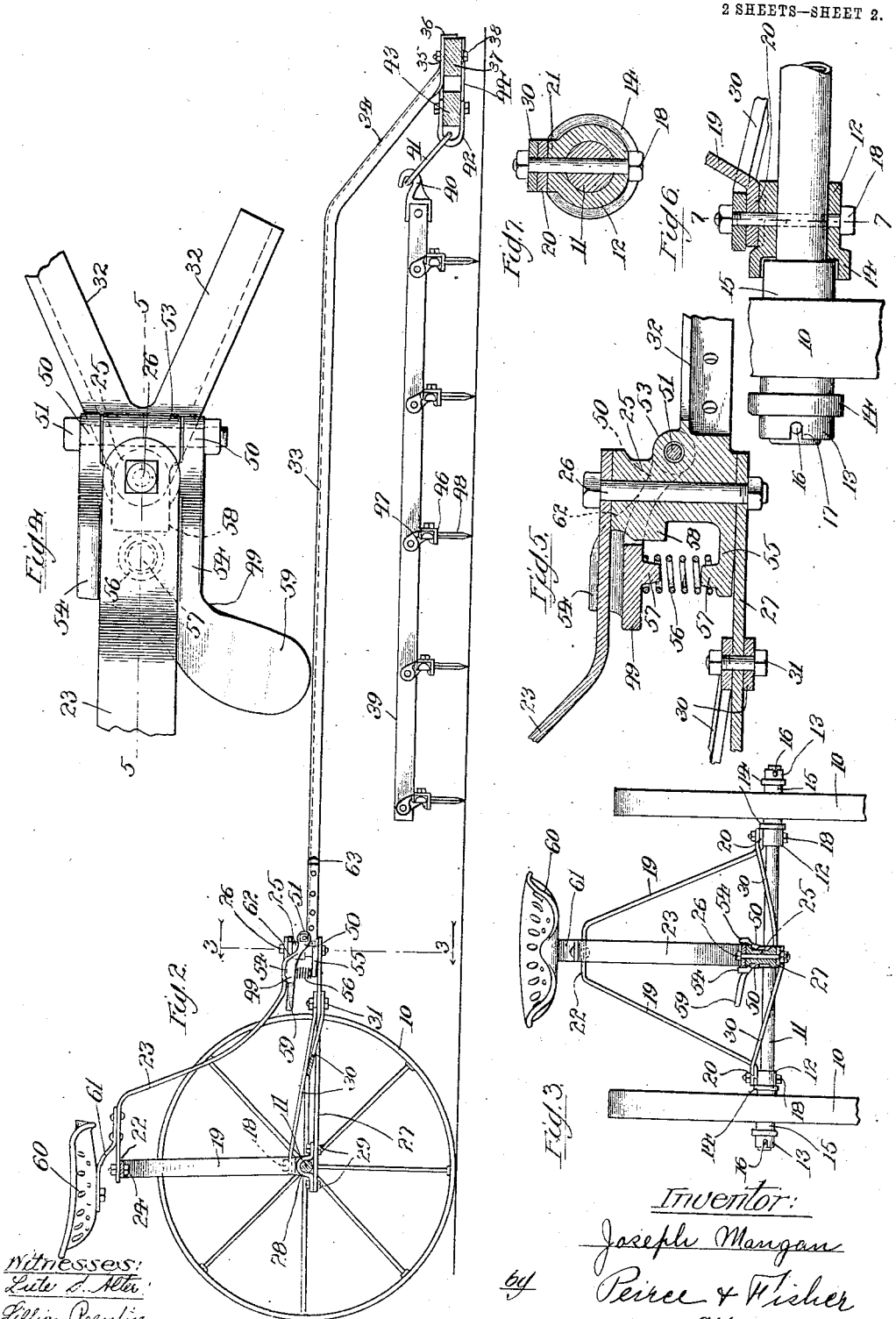

UNITED STATES PATENT OFFICE.

JOSEPH MANGAN, OF GALESBURG, ILLINOIS.

RIDING ATTACHMENT FOR HARROWS.

No. 870,570.   Specification of Letters Patent.   Patented Nov. 12, 1907.

Application filed July 13, 1905. Serial No. 269,467.

*To all whom it may concern:*

Be it known that I, JOSEPH MANGAN, a citizen of the United States, and a resident of Galesburg, county of Knox, and State of Illinois, have invented certain new and useful Improvements in Riding Attachments for Harrows, of which the following is declared to be a full, clear, and exact description.

The invention relates to a riding attachment for harrows and the like and seeks to provide a simple and convenient construction comprising a suitable frame mounted on wheels and carrying the rider's seat, together with means for suitably attaching the wheel frame, preferably to the draft apparatus or evener to which the harrow or harrow sections are also connected.

The invention also seeks to provide suitable means by which the wheel frame may properly swivel or caster to turn around corners, together with devices by which it may be held rigidly in line with the straight travel of the team.

The invention consists in the features of construction, arrangements and combinations of parts set forth in the following description, illustrated in the accompanying drawings and more particularly pointed out in the appended claims.

In the drawings Figure 1 is a plan view of the improved riding attachment shown connected to the draft evener for use, certain parts of the draft evener and harrow sections being broken away. Fig. 2 is a side elevation thereof with the wheel frame and draft evener shown in section. Fig. 3 is a front elevation of the riding attachment with certain parts shown in section on line 3—3 of Fig. 2. Fig. 4 is an enlarged detail plan view of the coupling between the wheel frame and the connecting brace bars. Fig. 5 is a section on line 5—5 of Fig. 4. Fig. 6 is an enlarged view showing the connection between the frame bars and the wheel axle, certain parts being shown in section. Fig. 7 is a section on line 7—7 of Fig. 6.

The supporting wheels 10 are carried upon the ends of a cross axle 11. The wheels are held upon the shaft between the inner axle boxes or washers 12 and the outer axle boxes or washers 13 (see Fig. 6). These washers are provided with flanged portions 14 that extend over the ends of the hubs 15 of the wheels 10. The outer axle box is removably held in place by a cotter-pin 16, or other suitable means extending through the shaft and engaging notches 17 in the washer. The inner axle boxes or washers 12 are held in place by bolts 18 extending through the washers and through the shaft.

The wheel frame is preferably formed of wrought iron or steel bars and comprises the upright side bars 19 that are bent at their lower ends forming horizontally extending portions 20 that rest upon the raised bosses 21 on the washers 12 (see Fig. 7), and which are securely connected to the washers and axle by the bolts 18. From the axle boxes 12, the side upright bars extend inwardly toward each other and they are suitably connected at their upper ends or, as is preferable, these side uprights may be formed of a single bent bar having a flattened, central portion 22. The upper horizontal portion of an upper, central bar 23 is connected to the upper ends of the side uprights 19 by a bolt 24. This bar 23 extends forwardly and downwardly from its connection with the side uprights and its lower horizontal portion rests upon the upper flat end of a sleeve or thimble 25, and is connected thereto by a vertical pivot bolt 26. The lower center bar 27 of the wheel frame abuts against the lower flat face of the sleeve 25, and engages the lower end of the pivot bolt 26. The rear end of the lower center bar 27 extends beneath the axle 11 and is securely connected thereto by a U-strap 28 extending over the axle and bolts 29 that pass through the ears of the U-strap and through the bar 27 (see Fig. 2). Diagonal brace bars 30 engage the upper ends of the bolts 18 and are connected thereby to the ends of the wheel axle. The forward ends of the diagonal brace bars overlap the lower center bar 27 near its forward end and are connected thereto by a bolt 31.

The thimble or sleeve 25 is preferably formed of cast metal and is provided with forwardly extending divergent arms 32 that are cast in piece with the body of the sleeve or thimble. Connecting brace bars 33 are preferably formed of angle-iron or steel and are bolted at their rear ends to the arms 32. These angle bars diverge forwardly and are provided with downwardly bent portions 34, which are adapted to engage with the draft evener. The upper horizontal flanges of these angle bars are turned inwardly and the vertical flanges of the angle bars extend downwardly so that the bars are rigid and strong to properly support the forward end of the wheel frame. The flanges of the angle-bars at the forward ends of the inclined portions 34 thereof, are flattened out and bent to form horizontal portions 35 having downwardly turned lips 36 so as to snugly fit the upper face and front edge of the front bar 37 of the draft evener. Bolts 38 rigidly connect the front ends of the connecting brace-bars with the draft evener bar 37.

The attachment may be used with any suitable form of harrow and draft evener. In the drawings the harrow sections comprised the longitudinal bars 39 having hooks 40 at their front ends which engage the coupling links 41 of the draft evener. These coupling links are connected to the swiveled loops 42 on the rear bars 43 of the draft evener and the rear bars 43 are connected by links 44 to the front evener bar 37. The draft connections 45 (the rear portions only of which are shown in Fig. 1), are connected to the front evener bar 37.

The cross bars 46 of the harrow sections are connected by arms 47 to the longitudinal bars 39 and carry the harrow teeth 48.

A latch 49, preferably formed of cast metal, is arranged in rear of the thimble or sleeve 25 (see Figs. 4 and 5), and is provided with arms 50 that extend forwardly on opposite sides of the sleeve 25 and are connected thereto by a horizontal pivot bolt 51. This pivot bolt extends through a central boss 53 on the front side of the sleeve 25. The latch is also provided on its upper face with lugs 54 that project upwardly on opposite sides of the forward end of the center frame bar 23. The casting or sleeve 25 has at its lower end a rearwardly projecting lug 55, and a coiled spring 56 extends between bosses 57 on the upper face of the lug 55 and on the lower face of the latch 49. This spring serves to hold the latch normally in its raised position with the lugs 54 thereon engaging the upper center bar 23 of the wheel frame. In its normal raised position, the latch prevents the wheel frame from swiveling on the vertical pivot bolt 26, and holds it rigidly in line with the path of travel of the harrow. The casting or sleeve 25 is preferably provided on its rear face with a square lug 58 that sets between the arms 52 of the latch so as to resist any side strain on the latter. The latch is also provided on one side with a laterally extending foot-piece or trip 59 by which the rider may release the latch so that the wheel frame may swivel or caster in turning around a corner.

The rider's reat 60 is preferably mounted directly on the wheel frame and is connected to the upper, horizontal portion of the center bar 23 by a spring piece 61. The seat is located, as shown, slightly in rear of the axle 11 so that the weight of the rider will nicely balance the parts of the attachment in front of the axle.

The wheel frame comprising the upright side bars 19, the upper and lower center bars 23 and 27 and the horizontal brace bars 30 is light and inexpensive and at the same time strong and rigid. The front portions 34 of the connecting brace bars 33 are so arranged that the main portions of the connecting bars are held substantially in horizontal position. The center bars 23 and 27 of the wheel frame engage the flat, horizontal upper and lower ends of the casting 25 and the connecting bars are rigidly connected at their forward ends to the draft evener so that all parts are securely held in proper horizontal position when in use. At the same time however, there is sufficient spring in the connecting bars 33 to permit up and down play of the wheel frame as it passes over irregularities in the ground. When the harrow is drawn straight ahead, the wheel frame is locked by the latch 49 so that it does not sway from side to side. For this reason it is a more comfortable riding attachment than those heretofore employed. However, the latch may be released to permit the wheel frame to swivel or caster so that it will trail properly as the harrow is turned around a corner. It should be noted that the forward ends of the lugs 54 of the latch are provided with inclined cam-faces 62 so that after the latch has been released to permit the swivel of the wheel frame, the upper center bar 23 will engage one or the other of the inclined cam-faces 62, depress the latch and automatically swing back into reëngagement thereof when the harrow is again drawn forward in straight line direction. The brace-bars are preferably provided at their inner ends with foot-rests 63.

It is obvious that numerous changes may be made in the details of structure without departure from the essentials of the invention.

Having described my invention, what I claim as new and desire to secure by Letters Patent is:

1. In riding attachments for harrows and the like, the combination with the wheel frame, of the coupling sleeve provided with divergent arms, a vertical pivot bolt connecting said sleeve and wheel frame, divergent angle bars rigidly secured to the arms of said coupling sleeve and arranged to extend over the harrow, said divergent angle bars having downwardly bent front portions with flattened ends engaging one of the bars of the draft evener and bolts for rigidly securing the flat ends of said bars to the draft evener, substantially as described.

2. In riding attachments for harrows and the like the combination with the wheel frame comprising upper and lower bars having forwardly projecting portions, of a coupling sleeve arranged between the forward ends of said frame bars, a vertical pivot bolt connecting said sleeves and frame bars and a pair of divergent connecting bars rigidly secured at their rear ends to said coupling sleeve, substantially as described.

3. In riding attachments for harrows and the like, the combination with the wheel frame comprising upper and lower bars having forwardly projecting portions, of a coupling sleeve arranged between the forwardly projecting portions of said frame bars, a vertical pivot bolt connecting said sleeve and frame bars, a pair of divergent connecting bars rigidly secured at their rear ends to said sleeve and arranged to extend forwardly and horizontally over the harrow, said connecting bars having downwardly extending front portions and means for rigidly securing the forward ends of said connecting bars to the draft evener, substantially as described.

4. In riding attachments for harrows and the like, the combination with the wheel frame comprising upright side bars and upper and lower bars connected to said side bars and having forwardly extending portions, of a coupling sleeve between the forwardly extending portions of said upper and lower frame-bars, a vertical pivot bolt extending through said bars and sleeve, and divergent connecting brace-bars secured at their rear ends to said coupling sleeve arranged to extend over said harrow and connect to the draft evener, substantially as described.

5. In riding attachments for harrows and the like, the combination with the wheel frame comprising upright side bars and upper and lower bars connected to said side bars and having flat, horizontal, forwardly extending portions, of a coupling sleeve having flat ends arranged between said forwardly extending portions, a vertical pivot bolt extending through said sleeve and the front portion of said frame-bars, and a pair of divergent connecting-bars secured at their rear ends to said sleeve, substantially as described.

6. In riding attachments for harrows and the like, the combination with the wheel frame comprising upper and lower bars having forwardly projecting portions, of a coupling sleeve between the forward ends of said frame bars, a vertical pivot bolt connecting said sleeve and bars, and divergent angle-bars connected at the rear end to said sleeve arranged to extend forwardly in horizontal position over the harrow and having downwardly extending front portions with flattened ends shaped to engage one of the evener-bars, substantially as described.

7. In riding attachments for harrows and the like, the combination with the wheel frame comprising upper and lower bars having forwardly projecting portions, of a coupling sleeve between the forward ends of said frame bars, a vertical pivot bolt connecting said sleeve and bars, divergent angle-bars secured at their rear ends to said coupling sleeve, arranged to extend forwardly in horizontal position and having downwardly extending front portions with flattened ends and downturned lips to snugly engage the evener-bar, and bolts rigidly connecting the ends of said angle-bars to said evener-bar, substantially as described.

8. In riding attachments for harrows and the like, the combination with the coupling, of a wheel frame comprising the wheel axle, upright side bars connected to the ends of said axle, upper and lower frame-bars connected to said side bars extending forwardly therefrom and vertically pivoted to said coupling, and connecting brace-bars rigidly secured to said coupling, substantially as described.

9. In riding attachments for harrows and the like, the combination with the coupling and with the connecting brace-bars secured thereto, of the wheel frame comprising the wheel axle, the upright side bars, the upper and lower center bars secured respectively to the upper ends of said side bars and to said wheel axle, the forward ends of said center frame bars being vertically pivoted to said coupling, and inclined brace-bars extending between the forward end of said lower center bar and the ends of said axle, substantially as described.

10. In riding attachments for harrows and the like, the combination with the wheel axle, supporting wheels and wheel boxes, of the upright side-bars, the lower horizontal frame bars, bolts connecting the lower ends of said upright, the rear ends of said brace-bars and the inner wheel boxes to said axle, an upper frame bar connected at its rear end to the upper ends of said uprights, a coupling sleeve arranged between the forward ends of said frame bars, a vertical pivot bolt connecting said sleeves and bars, and connecting brace-bars secured at their rear ends to said coupling sleeve.

11. In riding attachments for harrows and the like, the combination with the wheel frame having upper and lower forwardly extending bars, of a sleeve arranged between the forward ends of said frame bars, a vertical pivot bolt connecting said bars and sleeve, connecting bars secured at their rear ends to said sleeve and a depressible spring-held latch comprising separate arms arranged on opposite sides of said coupling sleeve and horizontally pivoted thereto, said latch having means engaging one of said frame bars to hold the wheel frame against lateral swing, substantially as described.

12. In riding attachments for harrows and the like, the combination with the wheel frame carrying a rider's seat and comprising frame bars extending forwardly from the wheel axle and the rider's seat, of a coupling to which said frame bars are vertically pivoted at their forward ends, connecting brace-bars for engaging the harrow secured at their rear ends to said coupling, and a releasable latch having an operating foot-piece for holding the wheel frame against lateral swing, substantially as described.

13. In riding attachments for harrows and the like, the combination with the wheel frame having upper and lower forwardly extending bars, of a sleeve arranged between the forward ends of said frame bars, a vertical pivot bolt connecting said bars and sleeve, connecting bars secured at their rear ends to said sleeve and a depressible spring-held latch comprising separate arms arranged on opposite sides of said coupling sleeve and horizontally pivoted thereto, said latch having a laterally extending foot-piece and a pair of lugs for engaging the upper frame bar to hold the wheel frame against lateral swing, said lugs being cam shaped to automatically reengage said frame bar when released therefrom, substantially as described.

14. In riding attachments for harrows and the like, the combination with wheel frame comprising frame-bars having forwardly extending portions, of a coupling sleeve arranged between the front ends of said frame bars, a vertical pivot bolt connecting said sleeve and bars, connecting-bars secured at their rear ends to said sleeve and a releasable spring-held latch horizontally pivoted on said coupling sleeve and arranged to engage one of the bars of said wheel frame to hold the same against lateral swing, substantially as described.

JOSEPH MANGAN.

Witnesses:
W. H. SULLIVAN, Jr.,
MORTON L. WOLFNER.